United States Patent
He et al.

(10) Patent No.: US 9,426,823 B2
(45) Date of Patent: Aug. 23, 2016

(54) METHOD AND APPARATUS FOR RANDOM ACCESS

(75) Inventors: Chuanfeng He, Beijing (CN); Xueli Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 879 days.

(21) Appl. No.: 13/358,875

(22) Filed: Jan. 26, 2012

(65) Prior Publication Data

US 2012/0147859 A1 Jun. 14, 2012

Related U.S. Application Data

(63) Continuation of application No. PCT/CN2010/075060, filed on Jul. 8, 2010.

(30) Foreign Application Priority Data

Jul. 30, 2009 (CN) .......................... 2009 1 0161022

(51) Int. Cl.
*H04W 72/04* (2009.01)
*H04J 3/00* (2006.01)
*H04W 74/00* (2009.01)
(Continued)

(52) U.S. Cl.
CPC ............ *H04W 74/006* (2013.01); *H04W 52/50* (2013.01); *H04W 74/0833* (2013.01)

(58) Field of Classification Search
CPC .................................................... H04W 52/50
USPC .......................................... 370/329, 336, 462
See application file for complete search history.

(56) References Cited

U.S. PATENT DOCUMENTS 8,391,223 B2 * 3/2013 Barraclough et al. ........ 370/329
8,411,626 B2 * 4/2013 Kuo .............................. 370/329
(Continued)

FOREIGN PATENT DOCUMENTS

CN   101237694 A   8/2008
CN   101262279 A   9/2008
(Continued)

OTHER PUBLICATIONS

International search report for corresponding International application No. PCT/CN2010/075060, dated Oct. 14, 2010, total 3 pages.
(Continued)

*Primary Examiner* — Donald Mills
*Assistant Examiner* — Henry Baron
(74) *Attorney, Agent, or Firm* — Leydig, Voit & Mayer, Ltd.

(57) ABSTRACT

Method and apparatus for random access are provided. A base station sends access control information to a UE. The access control information includes an identifier of the UE and an access control command. The UE obtains an access time slot and a preamble signature according to the access control information received from the bases station. Then the UE initiate, according to the access time slot and the preamble signature, a random access procedure with a preamble power ramping. With the embodiments of the present invention, time delay in random access procedures may be decreased so as to enable the UE to complete the uplink access as quickly as possible and provide a feedback for a downlink transmission. Therefore efficiencies of the downlink transmission are enhanced.

16 Claims, 5 Drawing Sheets

(51) Int. Cl.
   *H04W 52/50*    (2009.01)
   *H04W 74/08*    (2009.01)

(56) References Cited

U.S. PATENT DOCUMENTS

| | | | | |
|---|---|---|---|---|
| 8,982,805 | B2* | 3/2015 | Chen | H04W 74/002 370/329 |
| 2008/0225785 | A1* | 9/2008 | Wang | H04W 74/002 370/329 |
| 2008/0259900 | A1 | 10/2008 | Masuda | |
| 2012/0294145 | A1* | 11/2012 | Steudle | 370/230 |

FOREIGN PATENT DOCUMENTS

| | | |
|---|---|---|
| CN | 101478786 A | 7/2009 |
| CN | 101478827 A | 7/2009 |
| CN | 101494865 A | 7/2009 |
| CN | 101572949 A | 11/2009 |
| WO | 2008042967 A2 | 4/2008 |
| WO | 2008115451 A1 | 9/2008 |

OTHER PUBLICATIONS $2^{nd}$ Office Action in corresponding Chinese Patent Application No. 200910161022.5 (Apr. 3, 2013).

Written opinion issued in corresponding to PCT application No. PCT/CN2010/075060,dated Oct. 14, 2010,3 pages total.

Office action issued in corresponding to CN application No. 200910161022.5 and its English translation, dated Jul. 31, 2012,10 pages total.

"$3^{rd}$ Generation Partnership Project; Technical Specification Group Radio Access Network; Multiplexing and channel coding (FDD) (Release 8)," 3GPP TS 25.212, V8.5.0, pp. 1-107, $3^{rd}$ Generation Partnership Project, Valbonne, France (Mar. 2009).

"$3^{rd}$ Generation Partnership Project; Technical Specification Group Radio Access Network; Physical layer procedures (FDD) (Release 8)," 3GPP TS. 25.214, V8.6.0, pp. 1-92, 3rd Generation Partnership Project, Valbonne, France (May 2009).

"$3^{rd}$ Generation Partnership Project; Technical Specification Group Radio Access Network; Medium Access Control (MAC) protocol specification (Release 8)," 3GPP TS 25.321, V8.6.0, pp. 1-185, $3^{rd}$ Generation Partnership Project, Valbonne, France (Jun. 2009).

* cited by examiner

METHOD AND APPARATUS FOR RANDOM ACCESS

CROSS-REFERENCE TO RELATED APPLICATIONS

This application is a continuation of an International Application No. PCT/CN2010/075060, filed on Jul. 8, 2010, which claims priority to Chinese Patent Application No. 200910161022.5, filed on Jul. 30, 2009. Both of the aforementioned patent applications are herein incorporated by reference in their entireties.

TECHNICAL FIELD

The present application relates to the field of communications technologies, and in particular, to a method and an apparatus for random access.

BACKGROUND

In a Release 7 (R7) version of 3rd Generation Partnership Project (3GPP) Wideband Code Division Multiple Access (WCDMA), a new feature, Enhanced Cell-Forward Access Channel (Enhanced CELL-FACH), is introduced in order to enhance a downlink data rate of a user equipment (UE) in a Cell-Forward Access Channel (CELL-FACH) state and a Cell-Paging Channel (CELL-PCH) state. Through the Enhanced CELL-FACH feature, the UE is capable of receiving downlink data from a High Speed Downlink Shared Channel (HS-DSCH) when the UE is in the CELL-FACH state or the CELL-PCH state. However, the uplink transmission is still through a Physical Random Access Channel (PRACH) according to the Release 99 (R99) version of the 3GPP WCDMA, so a Hybrid Automatic Repeat Request (HARM) feedback cannot be provided. Therefore, the downlink HS-DSCH transmission is in a blind retransmission manner. That is, the retransmission is not performed according to an acknowledgement/non-acknowledgement (ACK/NACK) feedback from the UE, but in a fixed number of times.

An access procedure in a 3GPP WCDMA R8 version, in which an "Enhanced Uplink for CELL-FACH" feature is introduced, is similar to that in the R99 version. The basic characteristic of the procedure is: when transmitting uplink data, a UE randomly selects, according to an Access Service Class (ASC) of the UE, an available signature to send a preamble, and detects, within a corresponding downlink access time slot, whether there is an acquisition indicator corresponding to the sent signature in an Acquisition Indicator Channel (AICH). If no acquisition indicator is received, the UE ramps-up a transmitting power, and continues to send the same preamble in a next available access time slot. What is different from the R99 version is that: in the 3GPP WCDMA R8 version, a Node B, through the AICH, not only sends the acquisition indicator to the UE, but also an index of an Enhanced Dedicated Channel (E-DCH) resource for use by the UE. The index of the E-DCH resource and the corresponding resource configuration information are broadcasted to the UE through a system message. The UE uses the E-DCH resource corresponding to the index to start the uplink transmission at the time of a high-level configuration.

However, in the above conventional Enhanced Uplink for CELL-FACH technologies, when data carried by an HS-DSCH channel is transmitted to UEs in the CELL-FACH state, only those UEs supporting the Enhance Uplink for CELL-FACH feature which have completed uplink access and have the uplink E-DCH resources can send an ACK/NACK and a Channel Quality Indicator (CQI) through a Dedicated Physical Control Channel for HS-DSCH (HS-DPCCH), so as to enable the retransmission according to the ACK/NACK feedback of the UE. Otherwise, for the UEs not supporting the Enhance Uplink for CELL-FACH feature, the blind retransmission is used in the downlink HS-DSCH transmission. The blind retransmission may lower a utilization efficiency of the downlink HS-DSCH resources and lower a throughput of the downlink transmission. Therefore, when the Node B needs to send data to the UE through the HS-DSCH channel, if the UE does not complete the uplink access and obtain the uplink E-DCH resources, the UE would be unable to send feedback to the Node B. Therefore, the utilization efficiency of the HS-DSCH resources cannot be improved.

SUMMARY OF THE INVENTION

Embodiments of the present invention provide a method and an apparatus for random access, which may enable a UE to complete an uplink access as quickly as possible and provide a feedback for a downlink transmission, and therefore an efficiency of the downlink transmission is enhanced.

In one aspect of the present invention, a method for random access is provided. The method includes:

receiving access control information from a base station, in which the access control information includes a user equipment identifier and an access control command, or includes the user equipment identifier, the access control command and an access service class used for access;

acquiring, by a UE corresponding to the user equipment identifier, an access time slot and a preamble signature which are used for access, according to the access control information; and initiating, according to the access time slot and the preamble signature, an uplink random access procedure with a preamble power ramping.

In another aspect of the invention, an apparatus for random access is provided. The apparatus includes:

an information receiving unit, configured to receive access control information from a base station, in which the access control information includes a user equipment identifier and an access control command, or includes the user equipment identifier, the access control command and an access service class;

a resource acquiring unit, communicatively connected to the information receiving unit, configured to acquire, according to the access control information, an access time slot and a preamble signature which are used for access; and a preamble sending unit, configured to initiate, according to the access time slot and the preamble signature acquired by the resource acquiring unit, an uplink random access with a preamble powering ramping.

In a further aspect of the invention, a method for controlling random access is provided. The method includes: sending, by a base station, access control information to a UE, in which the access control information includes a user equipment identifier and an access control command, or includes the user equipment identifier, the access control command and an access service class used for access, to enable the UE to acquire a access time slot and a preamble signature, and to initiate the random access with a preamble power ramping; and sending, by the base station, an acquisition indicator to the UE if detecting an access preamble which is transmitted by the UE according to the access control information.

In yet another aspect of the invention, an apparatus for controlling random access is provided. The apparatus includes:

an information sending unit, configured to send access control information to a UE, in which the access control information includes a user equipment identifier and an access control command, or includes the user equipment identifier, the access control command and an access service class used for access; the control information is used for the UE to acquire an access time slot and a preamble signature and to initiate, according to the access time slot and the preamble signature, the random access with a preamble power ramping; and an indication sending unit, configured to send a acquisition indicator to the UE if receives an access preamble sent by the UE according to the access time slot and the preamble signature acquisition indicator.

By using the method and apparatus provided in the embodiments of the present invention, a UE is enabled to complete an uplink random access as quickly as possible and thus can provide a feedback for a downlink transmission. Therefore the efficiency of the downlink transmission is enhanced.

BRIEF DESCRIPTION OF THE DRAWINGS

Accompanying drawings described herein are provided for better understanding of the present invention. The accompanying drawings are a part of the application, but are not intended to limit the scope of the present invention. In the accompanying drawings.

DETAILED DESCRIPTION

In order to make the objectives, technical solutions, and advantages of the present invention more clear, the present invention is further described in detail below through embodiments with reference to the accompanying drawings. Here, the exemplary embodiments and illustration of the present invention are only intended to explain the present invention, rather than to serve as a limitation of the present invention.

Figure 1:
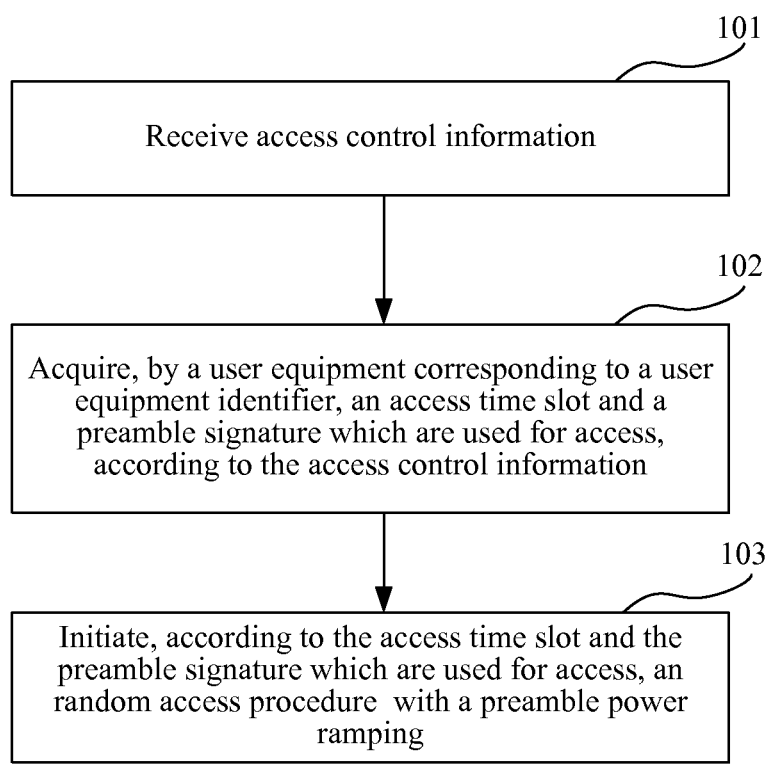
FIG. 1 is a flowchart of a method for random access according to an embodiment of the present invention.

FIG. 1 is a flowchart of a method for random access according to an embodiment of the invention. As shown in FIG. 1, the method includes: receiving access control information, in which the access control information includes a user equipment identifier and an access control command, or the access control information includes the user equipment identifier, the access control command and an access service class used for access (step 101); acquiring, by a user equipment (UE) corresponding to the user equipment identifier, an access time slot and a preamble signature which are used for access, according to the access control information (step 102); and initiating, according to the access time slot and the preamble signature, a random access procedure with a preamble power ramping (step 103).

In this embodiment, the access control command refers to a command for controlling the UE to initiate the random access. The UE initiates the random access after receiving the access control command. The access control command may be an access command, or may be an uplink resource index.

In this embodiment, the UE may receive the access control information from a base station. For example, in a 3GPP WCDMA network system, the UE may receive the access control information from a Node B. The access control information may be carried by a Shared Control Channel for HS-DSCH order (HS-SCCH order). However, the HS-SCCH order does not serve as a limitation to the invention, and other messages may be adopted to carry the access control information according to actual requirements.

In this embodiment, the above step 103 may comprise that the UE sends an access preamble according to the access time slot, the preamble signature and a preset initial transmitting power. The initial transmitting power may be set according to a commanded preamble power, a minimum power requirement and a maximum allowable power.

In this embodiment, after the UE sends the access preamble, if an acquisition indicator returned by the base station is received and the acquisition indicator is an acknowledgment message, it may be determined that the random access is successfully. Therefore, the UE is enabled to complete the uplink random access as quickly as possible. For example, in the 3GPP WCDMA network system, if the acquisition indicator transmitted by the Node B is received and the acquisition indicator is an acknowledgment message, it may be determined that the random access is successfully.

In this way, after accessing successfully, the UE may perform an uplink transmission. The uplink transmission may include the transmission of uplink dedicated physical channel control information, uplink data and/or feedback information. Therefore, when the base station needs to send data to the UE through the HS-DSCH channel, the UE may be controlled to send a corresponding feedback to the base station to enhance the utilization efficiency of the HS-DSCH resources.

It can be seen from the above descriptions that, in the above embodiment, the UE acquires, according to the access control information, the access time slot and the preamble signature for access, and initiates, according to the access time slot and the preamble signature, the uplink random access procedure with a preamble power ramping. Therefore, the UE is enabled to complete the uplink access as quickly as possible, and thus, a feedback can be provided for the downlink transmission, and the downlink transmission efficiency is enhanced.

Figure 2:
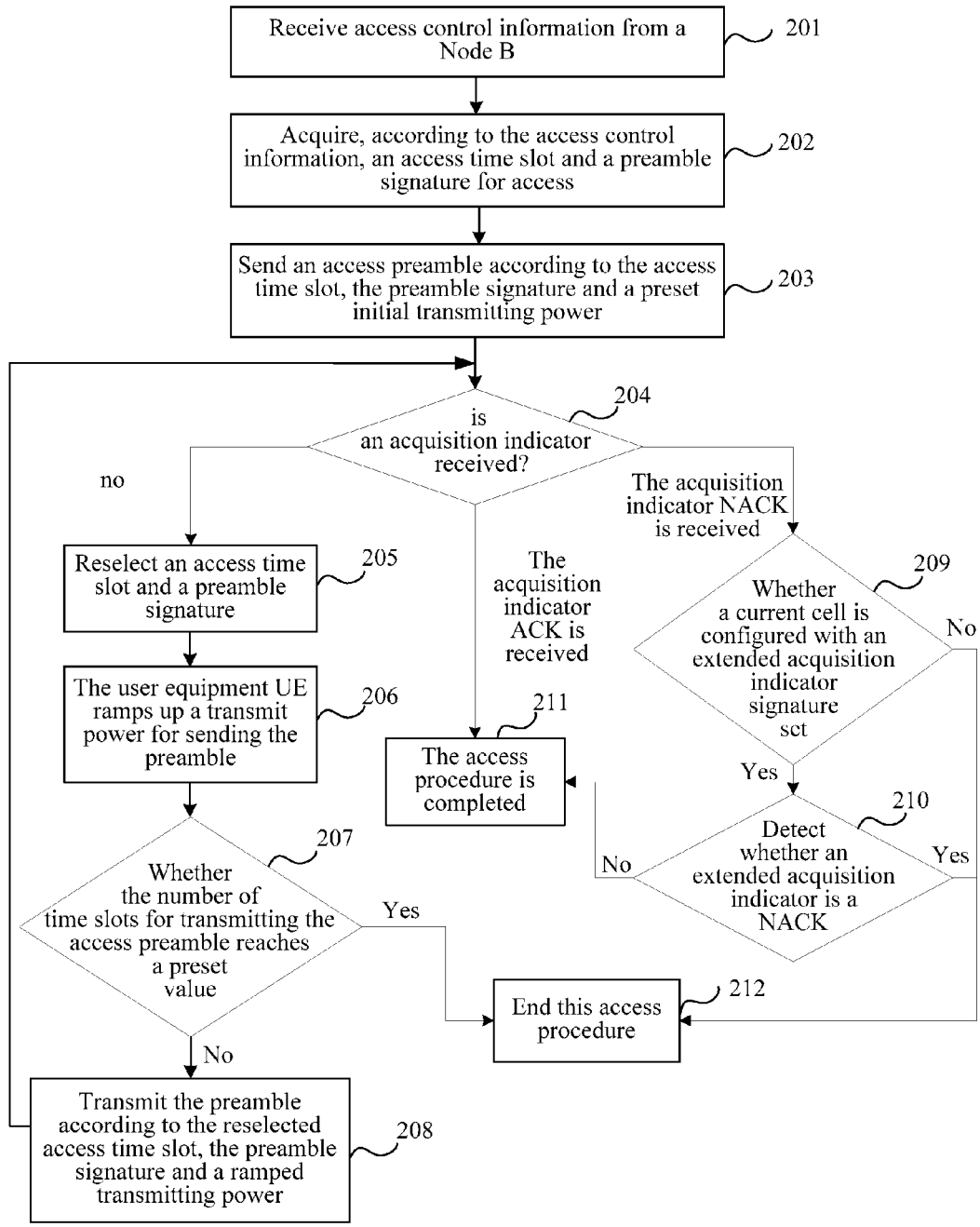
FIG. 2 is a flowchart of a method for random access according to another embodiment of the present invention.

Another method for random access is provided according to another embodiment of the invention. The method is described in detail in the following by taking a 3GPP WCDMA network system as an example. As shown in FIG. 2, the method includes:

Step 201: A UE receives access control information from a Node B. The access control information may include a user equipment identifier and an access control command. Or, the access control information may include the user equipment identifier, the access control command and an access service class used for access. The access control information is, however, not limited thereto, and may include other information according to actual requirements.

In this embodiment, the user equipment identifier may be represented as a UE ID, which does not serve as a limitation. The access control information may be carried by an HS-SCCH order, which also does not serve as a limitation.

Step 202: The UE acquires, according to the access control information, an access time slot and a preamble signature for access.

In this embodiment, the UE may acquire Access Service Class (ASC) information each time when a physical random access procedure is initiated. The UE may select, according to a PRACH resource corresponding to the ASC, an available preamble signature and an available access time slot to transmit an access preamble. A different ASC corresponds to a different available PRACH resource, which determines an access chance of the UE.

For example, in a WCDMA Frequency Division Duplex (FDD) system, eight levels of ASCs may be configured in advance, and they may be classified as ASC0, ASC1 ... ASC7 according to a priority of each ASC. For example, the ASC0 has the highest priority and the ASC7 has the lowest priority. Each ASC corresponds to a set of PRACH resource, which includes a set of available signatures and a set of available sub-channels. The set of available signatures includes the collection of all available preamble signatures among a total of sixteen preamble signatures. The set of available sub-channels includes a collection of the sub-channels available among a total of twelve sub-channels; and each sub-channel includes a sub-set of the total set of uplink access time slots. In this way, the UE may select, according to an ASC of the UE, an available preamble signature and an available access time slot to send an access preamble. In addition, each ASC may further correspond to a persistence value Pi which represents a probability of a persistent retry of the UE after a random access failure. An ASC with a higher priority is allocated with a larger Pi, and an ASC with a lower priority is allocated with a smaller Pi. For example, the ASC0, used in an emergency call or other situations of the same priority, has the highest priority and corresponds to the most PRACH resources. A UE belong to the ASC0 has the largest chance to access. P0 is the persistence value of the ASC0 and is always 1. The persistence value Pi of each of the other ASCs is determined by a "dynamic persistence level" $N=0\ldots7$ and a scaling factor Si in a system message, as shown in following Table 1.

TABLE 1

| ASC # i | | | | | | | |
|---|---|---|---|---|---|---|---|
| 0 | 1 | 2 | 3 | 4 | 5 | 6 | 7 |
| $P_i$ 1 | P(N) | $s_2$ P(N) | $s_3$ P(N) | $s_4$ P(N) | $s_5$ P(N) | $s_6$ P(N) | $s_7$ P(N) |

The usage of the ASC is illustrated in the situations below where the access control information includes a user equipment identifier and an access control command, or includes the user equipment identifier, the access control command and the access service class.

Example 1

The access control information includes a UE ID, an access control command, and an ASC.

The UE may select, from a set of available sub-channels and a set of available preamble signatures, respectively, an access time slot and a preamble signature for access. The set of the available sub-channels and the set of the available preamble signatures correspond to the ASC in the access control information.

For example, if the ASC in the access control information is an ASC3, the UE finds the PRACH resource corresponding to the ASC3. The PRACH resource includes a set of available signatures and a set of available sub-channels. In this way, the UE can select the access time slot and the preamble signature from the set of available sub-channels and the set of available signatures, respectively. The access time slot and the preamble signature may be randomly selected. Further, the ASC3 may also correspond to a persistence value P3, by which the UE may retry to access when the random access fails.

Example 2

The access control information includes a UE ID and an access control command.

In this case, the UE may select the access time slot and the preamble signature for access, from the set of all available sub-channels and the set of all available signatures, not limited by any particular ASC.

For example, when the access control information sent by the Node B does not include an ASC, the UE may randomly select the access time slot and the preamble signature for access, from a set of all available access sub-channels and a set of all available signatures, respectively.

Example 3

The access control information includes a UE ID and an access control command.

The UE selects an ASC from all pre-configured ASCs, and then selects an access time slot and a preamble signature for access, from the set of available sub-channels and the set of available signatures, which correspond to the selected ASC.

For example, when the access control information sent by the Node B does not include an ASC, the UE may select any one of the ASC0 to ASC8. In one instance, the ASC with a higher priority, such as ASC0, may be selected. Then the UE may find a PRACH resource corresponding to the selected ASC0, which includes a set of available signatures and a set of available sub-channels. The UE may randomly select the access time slot and the preamble signature from the set of available sub-channels and the set of available signature corresponding to the selected ASC0. Furthermore, if the random access fails, the UE may use the persistence value P0 corresponding to the selected ASC0 to retry for access.

Step 203: The UE transmits an access preamble according to the selected access time slot, the selected preamble signature and a preset initial transmitting power. The initial transmitting power may be set according to a commanded preamble power, a minimum power requirement, and a maximum allowable power.

Step 204: After beginning to send the access preamble, the UE determines whether an acquisition indicator sent by the Node B is received. If the acquisition indicator sent by the Node B is not received, perform step 205. If an acquisition indicator sent by the Node B is received and the received acquisition indicator is a non-acknowledgment message (NACK), perform step 209. If an acquisition indicator sent by the Node B is received and the received acquisition indicator is an acknowledgment message (ACK), perform step 211.

The acquisition indicator may be an acknowledgment message (ACK) or a non-acknowledgment (NACK). The acquisition indicator may also be represented by other information, not limited to the ACK or NACK message.

In this embodiment, the Node B may send the acquisition indicator in a downlink Fractional Dedicated Physical Channel (F-DPCH) time slot corresponding to the access time slot in which the UE transmits the access preamble. After beginning to send the access preamble, the UE may receive the acquisition indicator in the downlink F-DPCH time slot corresponding to the access time slot in which the access preamble is transmitted, but this does not serve as a limitation to the invention.

Step 205: The UE reselects another access time slot and another preamble signature to access.

Step 206: The UE ramps up the transmitting power for the access preamble. A constant step power ramping or an increased step power ramping may be used for ramping up the transmitting power. The constant step power ramping and the increased step power ramping may both be configured by a network side entity, but this does not serve as a limitation.

Step 207: Determine whether the number of the time slots for sending the access preamble reaches a preset value. If the preset value is not reached, perform step 208; if the preset value is reached, stop sending the access preamble, and perform step 212.

In this embodiment, the preset value may be the maximum number of retransmission and it may be pre-configured at the network side, but this does not serve as a limitation.

In this embodiment, a preamble retransmission counter may be used for counting. The value of the preamble retransmission counter may be reduced by 1 after each time the transmitting power is ramped up. If the value of the preamble retransmission counter is greater than zero, the preset value is not reached. If the value of the preamble retransmission counter is equal to zero, the preset value is reached.

Step 208: The UE transmits the access preamble according to the reselected access time slot, the reselected preamble signature and a ramped-up power. Steps 204 to 208 are repeated till an acquisition indicator is received.

Step 209: Determine whether a current cell is configured with an extended acquisition indicator signature set. If the extended acquisition indicator signature set is configured, perform step 210. If no extended acquisition indicator signature set is configured, perform step 212.

In this embodiment, an extended acquisition indicator is configured to indicate an uplink resource to the UE for using after the UE is accessed. If the current cell is configured with the extended acquisition indicator signature set, it indicates that an extended acquisition indicator may be obtained from the extended acquisition indicator signature set. Therefore, an uplink resource used by the UE after being accessed may be acquired.

Step 210: Detect whether the extended acquisition indicator is a non-acknowledgment message. If it is a non-acknowledgment message, perform step 212. If it is not a non-acknowledgment message, perform step 211.

Step 211: The access procedure is completed. If the acquisition indicator is received and the received acquisition indicator is an acknowledgment message, it indicates that the random access procedure is completed. If the received acquisition indicator is a non-acknowledgment message and if the current cell is configured with an extended acquisition indicator signature set and it is detected that the extended acquisition indicator is not a non-acknowledgment message, it can also determined that the random access procedure is completed.

In this embodiment, if the received acquisition indicator or the extended acquisition indicator is not a non-acknowledgment message, that is, is an acknowledgment message, the UE may acquire, through the received acquisition indicator or the extended acquisition indicator, the uplink resource of the UE for using after being accessed. The access procedure is completed.

Step 212: End the access procedure.

In this embodiment, after it is determined that the access is successful in step 211, the UE may perform a uplink transmission, which may includes the transmission of uplink dedicated physical channel control information, the transmission of uplink data and/or feedback information. The uplink data may include uplink service data and signaling. The feedback information may include HARQ feedback, or CQI feedback, which are provided for the downlink HS-DSCH transmission. However, the foregoing particular data, information or feedback does not serve as a limitation to the invention, and other data may also be included according to actual requirements.

It can be seen from the above embodiment that, the UE receives the access control information sent from a base station; selects, according to the access control information, the access time slot and the preamble signature which are used for access; and then initiates the uplink random access procedure with a preamble power ramping. When an acquisition indicator sent from the base station is received, and if the received acquisition indicator is an acknowledgment message, the uplink random access is determined to be successful. If the received acquisition indicator is a non-acknowledgment message, and the current cell is configured with an extended acquisition indicator signature set and an extended acquisition indicator is not a non-acknowledgment message, the random access is also successful. Therefore, the UE is enabled to complete the uplink random access as quickly as possible and thus can provide a feedback for the downlink transmission. Accordingly, the downlink transmission efficiency is enhanced.

Figure 3:
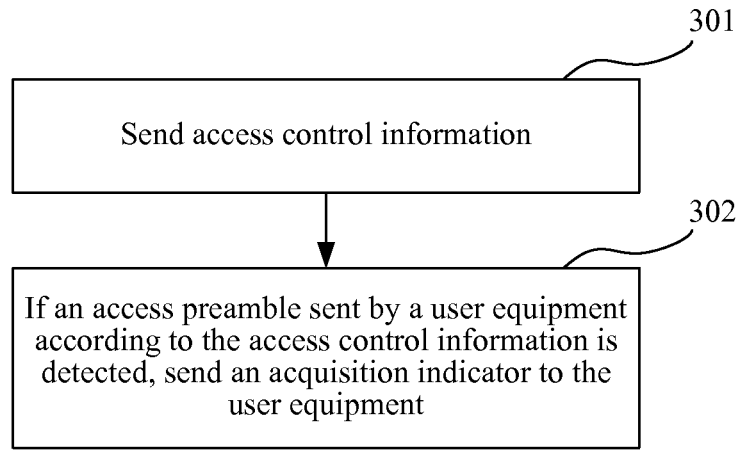
FIG. 3 is a flowchart of a method for controlling a random access according to another embodiment of the present invention.

In another embodiment of the invention, another method for controlling random access is provided. As shown in FIG. 3, the method includes: sending access control information to a UE, in which the access control information includes a UE ID and an access control command, or it may further include an ASC (step 301); sending an acquisition indicator to the UE if detecting an access preamble sent by the UE according to the access control information (step 302).

For a WCDMA network system, the access control information may be used by the UE to acquire an access time slot and a preamble signature which are used for access, and to initiate, according to the access time slot and the preamble signature, the uplink random access procedure with a preamble power ramping. If the access preamble is detected, the Node B sends the acquisition indicator in a downlink F-DPCH time slot corresponding to the uplink access time slot in which the access preamble is transmitted, but this does not serve as a limitation.

In this embodiment, when the access control information includes the UE ID and the access control command, the UE may select the access time slot and the preamble signature, which are used for the random access, from a set of all sub-channels and a set of all available signatures. The UE may also select an ASC from all pre-configured ASCs, and select the access time slot and the preamble signature, which are used for the random access, from the set of available sub-channels and the set of available signatures, which correspond to the selected ASC.

Alternatively, if the access control information includes a UE ID, an access control command and an ASC, the UE may select the access time slot and the preamble signature, which are used for access, from the set of available sub-channels and the set of available signatures which correspond to the ASC indicated by the access control information.

It can be known from the above embodiment that the Node B sends the access control information to the UE. The access control information may include the UE ID and the access control command, or includes the UE ID, the access control command and the ASC. After detecting the access preamble sent by the UE, the Node B may send an acquisition indicator to the UE. By this way, when the UE receives the acquisition indicator and if the acquisition indicator is an acknowledgment message, the access procedure is completed.

Figure 4:
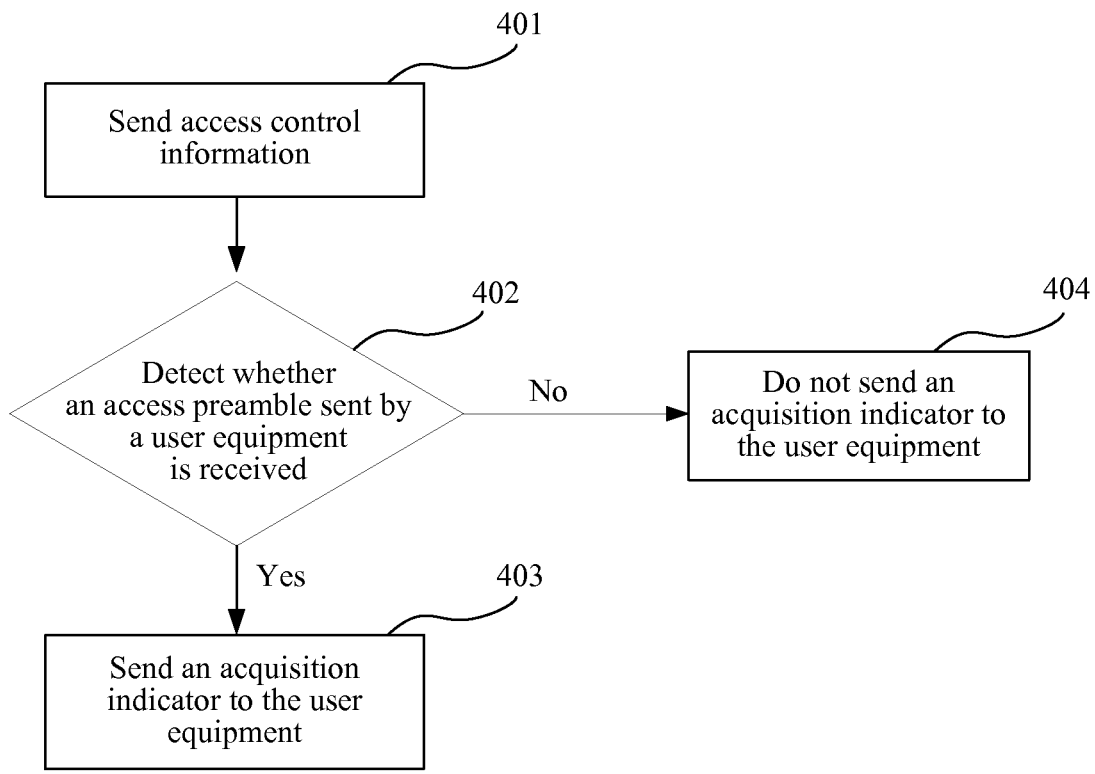
FIG. 4 is a flowchart of a method for controlling a random access according to another embodiment of the present invention.

In a further embodiment of the invention, another method for controlling a random access is provided. As shown in FIG. 4, the method includes the following steps: sending access control information, in which the access control information includes a UE ID and an access control command, or includes the UE ID, the access control command and an ASC (step 401) to a UE; detecting an access preamble sent by the UE (step 402); sending an acquisition indicator to the UE if an access preamble sent by the UE is detected (step 403). In the method, no acquisition indicator is sent to the UE if not detecting the access preamble sent by the UE (step 404).

In this embodiment, the access control information includes the UE ID and the access control command, or the access control information includes the UE ID, the access control command and the ASC used for access. However, the access control information is not limited thereto, and other information may also be included in the access control information according to actual requirements.

In this embodiment, the access control information may be used for the UE to acquire the access time slot and the preamble signature, which are used for access, and to initiate, according to the access time slot and the preamble signature, a random access procedure with a preamble power ramping.

The acquisition indicator may be an acknowledgment message (ACK) or a non-acknowledgment (NACK). However, the acquisition indicator is not limited thereto, and may also be represented by other forms of information.

It can be seen from the above embodiment that after detecting the access preamble sent by the UE, the Node B may send the acquisition indicator to the UE. If the acquisition indicator is an acknowledgment message, the access procedure is successful. If the acquisition indicator is a non-acknowledgment message, and when the current cell is configured with an extended acquisition indicator signature set and the sent extended acquisition indicator is not a non-acknowledgment message, the access procedure is also completed. If the Node B does not detect the access preamble sent by the UE, the Node B would not send acquisition indicator information to the UE, so that the UE ramps up the transmitting power of the access preamble, and may start an uplink feedback as quickly as possible.

Figure 5:
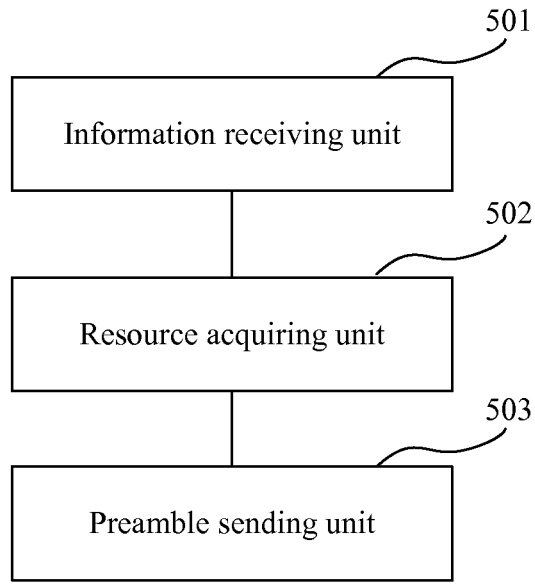
FIG. 5 is a block diagram of an apparatus for random access according to an embodiment of the present invention.

In a further embodiment of the invention, an apparatus for random access is provided. As shown in FIG. 5, the apparatus includes an information receiving unit 501, a resource acquiring unit 502, and a preamble sending unit 503. The information receiving unit 501 is configured to receive access control information. The access control information includes a UE ID and an access control command, or includes the UE ID, the access control command and an ASC. The resource acquiring unit 502, communicatively connected to the information receiving unit 501, is configured to obtain, according to the access control information, an access time slot and a preamble signature for access. The preamble sending unit 503, communicatively connected to the resource acquiring unit 502, is configured to initiate, according to the access time slot and the preamble signature, a random access procedure with a preamble power ramping.

In this embodiment, the apparatus may be a physical unit of the UE that corresponds to the UE ID, or may be a logical unit of the UE. A detailed work procedure of the apparatus may be obtained by referring to the descriptions of the method embodiment shown in FIG. 1, and is not repeated here.

It can be seen from the above that, the apparatus acquires, according to received access control information, an access time slot and a preamble signature for access; and transmits an access preamble to a base station. When an acquisition indicator sent from the base station is received and the received acquisition indicator is an acknowledgment message, the apparatus determines that the access is successful. Therefore, the random access is completed as quickly as possible and thus a feedback can be sent by the UE for a downlink transmission. According, the efficiency of the downlink transmission is enhanced.

Figure 6:
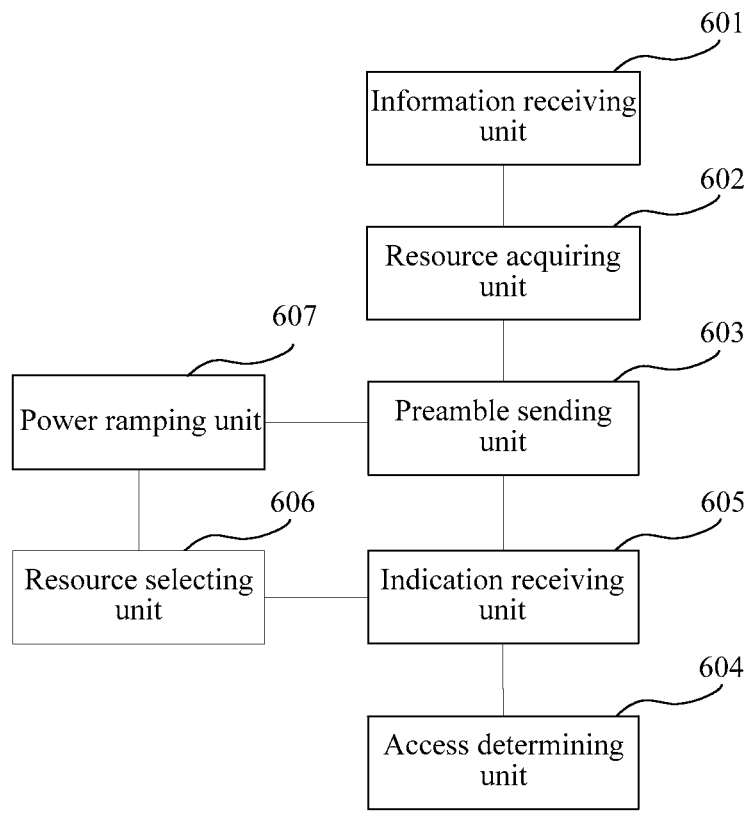
FIG. 6 is a block diagram of an apparatus for random access according to another embodiment of the present invention.

In yet another embodiment of the invention, another apparatus for random access is provided. As shown in FIG. 6. The apparatus includes an information receiving unit 601, a resource acquiring unit 602, a preamble sending unit 603, an access determining unit 604, an indication receiving unit 605, a resource selecting unit 606, and a power ramping unit 607. The functions of the information receiving unit 601, the resource acquiring unit 602 and the preamble sending unit 603 are similar to those of the information receiving unit 501, the resource acquiring unit 502 and the preamble sending unit 503 in the embodiment shown in FIG. 5, which are not repeated here.

In this embodiment, the access determining unit 604 is configured to, when an acquisition indicator is received and (1) the acquisition indicator is an acknowledgment message, or (2) when the acquisition indicator is a non-acknowledgment message, if the current cell is configured with an extended acquisition indicator signature set and an extended acquisition indicator is not a non-acknowledgment message, determine that the access is successful.

The indication receiving unit 605, communicatively connected to the preamble sending unit 603 and the access determining unit 604 respectively, is configured to, after the preamble sending unit 603 sends the access preamble, determine whether an acquisition indicator is received, and if the indication receiving unit 605 determines that the acquisition indicator is received, notify the access determining unit 604 of determining that the access is successful.

In this way, after the access succeeds, the apparatus may perform transmission of uplink dedicated physical channel control information, uplink data and feedback information, as described in the above embodiment related to FIG. 2, and the details thereof are not repeated here.

The resource selecting unit 606 is communicatively connected to the indication receiving unit 605 and is configured to, when the indication receiving unit 605 determines that the acquisition indicator is not received, reselect another access time slot and another preamble signature according to the access control information.

The power ramping unit 607 is communicatively connected to the preamble sending unit 603 and is configured to, after the indication receiving unit 605 determines that the acquisition indicator is not received and the resource selecting unit 606 reselects another access time slot and another preamble signature, ramp up the transmitting power of the access preamble. In this way, the preamble sending unit 603 may send an access preamble according to the reselected access time slot, the reselected preamble signature and the ramped-up transmitting power, till the indication receiving unit 605 determines that an acquisition indicator is received.

When the access control information includes a UE ID and an access control command, the resource acquiring unit 602 is specifically configured to: (1) select the access time slot and the preamble signature from a set of all sub-channels and a set of all available signatures; or (2) select an ASC from all pre-configured ASCs; and select the access time slot and the preamble signature, which are used for access, from the set of available sub-channels and the set of available signatures which correspond to the selected ASC.

When the access control information includes the UE ID, the access control command and an ASC used for access, the resource acquiring unit 602 is specifically configured to select the access time slot and the preamble signature, from the set of available sub-channels and the set of available signatures that correspond to the access service class indicated by the control information.

In the above embodiments, the apparatus may be a physical unit of a UE that corresponds to the UE ID, or a logical unit of the UE. A work procedure of the apparatus may be obtained by referring to description in the method embodiment shown in FIG. 2 and will not be detailed here again.

It can be known from the above embodiments that the apparatus acquires, according to the access control information, the access time slot and preamble signature for access; and initiates the uplink random access with a preamble power ramping. Therefore, the UE is enabled to complete the uplink access as quickly as possible and provide a feedback for a downlink transmission. As a result, the downlink transmission efficiency is enhanced.

Figure 7:
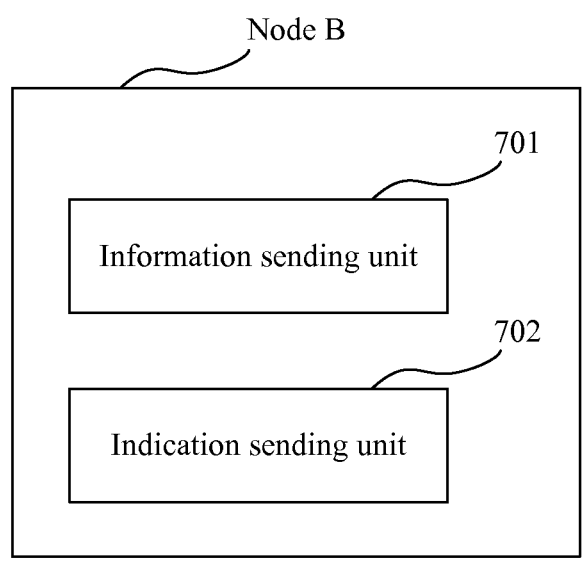
FIG. 7 is a block diagram of an apparatus for controlling a random access according to another embodiment of the present invention.

In yet another embodiment of the invention, an apparatus for controlling a random access of a UE is provided. As shown in FIG. 7, the apparatus may include an information sending unit 701 and an indication sending unit 702. The information sending unit 701 is configured to send access control information to the UE. The access control information includes a UE ID that corresponds to the UE and an access control command, or includes the UE ID, the access control command and an access service class (ASC). The indication sending unit 702 is configured to, when it is detected that an access preamble sent by the UE is received, send an acquisition indicator to the UE.

The access control information may be used by the UE to acquire the access time slot and the preamble signature which are used for access, and to initiate, according to the access time slot and the preamble signature, the access procedure with a preamble power ramping.

In this embodiment, when the access control information includes the user equipment identifier (UE ID) and the access control command, the UE (1) selects the access time slot and the preamble signature, which are used for access, from a set of all sub-channels and a set of all available signatures; or (2) selects a access service class from pre-configured ASCs; and selects the access time slot and the preamble signature, which are used for the access, from the set of available sub-channels and the set of available signatures, which correspond to the selected access service class.

In this embodiment, when the access control information includes the UE ID, the access control command and the ASC used for access, the UE may select the access time slot and the preamble signature, which are used for access, from the set of available of sub-channels and the set of available signatures which correspond to the access service class indicated by the control information.

In this embodiment, the apparatus may be a physical unit of a base station or Node B, or a logical unit of the base station or Node B. A work process of the apparatus may be obtained by referring to the descriptions of the embodiment related to FIG. 3 and are not be detailed here again.

It can be known from the above embodiment that after detecting the access preamble sent by the UE, the Node B may send the acquisition indicator to the UE, so that after the UE receives the acquisition indicator and the acquisition indicator is an acknowledgment message, the access process is determined as completed.

The objectives, technical solutions, and beneficial effects of the present invention have been illustrated through the above specific implementation manners. It should be understood what are described above is merely specific implementation manners of the present invention, but not intended to limit the protection scope of the present invention. Any modification, equivalent replacement, or improvement made within the spirit and principle of the present invention should fall within the protection scope of the present invention.

What is claimed is:

1. A method for random access, comprising:
   receiving, by a user equipment (UE) from a base station, access control information comprising a user equipment identifier (UE ID) of the UE, wherein the access control information instructs the UE to perform a random access procedure;
   acquiring, by the UE, an access time slot and a preamble signature according to the received access control information, wherein the acquiring comprises:
      selecting a highest priority access service class (ASC) from a plurality of pre-configured ASCs wherein each one of the pre-configured ASCs has a different priority, and
      obtaining the access time slot and the preamble signature according to the highest priority ASC; and
   performing, by the UE, according to the access time slot and the preamble signature, the random access procedure.

2. The method according to claim 1, wherein the acquiring step comprises:
   selecting, by the UE according to the access control information, the access time slot and the preamble signature from a set of all available sub-channels and a set of all available signatures, respectively.

3. The method according to claim 1, wherein the acquiring step further comprises:
   obtaining, by the UE, a Physical Random Access Channel (PRACH) resource corresponding to the selected ASC, wherein the PRACH resource comprises a set of available sub-channels and a set of available signatures; and
   selecting, by the UE, the access time slot and the preamble signature from the set of available sub-channels and the set of available signatures, respectively.

4. The method according to claim 3, wherein the access time slot and the preamble signature are randomly selected.

5. The method according to claim 1, wherein the access control information further includes an access service class (ASC), and the acquiring step comprises:
   selecting, by the UE, the access time slot and the preamble signature from a set of available sub-channels and a set of available signatures, wherein the set of the available sub-channels and the set of the available signatures correspond to the ASC included in the access control information.

6. The method according to claim 1, wherein the performing step comprises:
   transmitting, by the UE, an access preamble according to the access time slot and the preamble signature.

7. An apparatus, comprising:
a receiver configured to receive access control information from a base station, wherein the access control information comprises a user equipment identifier and the access control information instructs the apparatus to perform a random access procedure;
a processor configured to acquire an access time slot and a preamble signature according to the received access control information, wherein the acquiring comprises:
selecting a highest priority access service class (ASC) from a plurality of pre-configured ASCs wherein each one of the pre-configured ASCs has a different priority, and
obtaining the access time slot and the preamble signature according to the to the highest priority ASC; and
a transmitter, configured to perform, the random access procedure according to the obtained access time slot and the preamble signature.

8. The apparatus according to claim 7, wherein the apparatus is a physical or logical unit of a user equipment (UE), and wherein the user equipment identifier in the access control information is used for identifying the UE.

9. The apparatus according to claim 7, wherein the processor is configured to select, according to the access control information, the access time slot and the preamble signature from a set of all available sub-channels and a set of all available signatures, respectively.

10. The apparatus according to claim 7, wherein the processor is configured to select, obtain a Physical Random Access Channel (PRACH) resource corresponding to the selected ASC, wherein the PRACH resource a set of all available sub-channels and a set of available signatures; and select the access time slot and the preamble signature from the set of available sub-channels and the set of available signatures, respectively.

11. The apparatus according to 10, wherein the access time slot and the preamble signature are randomly selected from the set of all available sub-channels and the set of available signatures, respectively.

12. The apparatus according to claim 7, wherein the access control information further comprises an access service class (ASC), and the processor is configured to select the access time slot and the preamble signature from a set of available sub-channels and a set of available signatures, which correspond to the ASC.

13. The apparatus according to claim 7, wherein the transmitter is configured to transmit an access preamble according to the access time slot and the preamble signature to perform the random access procedure.

14. A communications system, comprising: a user equipment (UE) communicatively connected to a base station, wherein the UE is configured to:
receive access control information from the base station, wherein the access control information comprises an identifier of the UE and instructs the UE to perform a random access procedure;
select, according to the access control information, a highest priority access service class (ASC) from a plurality of pre-configured ASCs, wherein each one of the pre-configured ASCs has a different priority;
obtain an access time slot and a preamble signature according to the selected ASC; and
perform the random access procedure by transmitting an access preamble according to the obtained access time slot and the preamble signature.

15. The system according to claim 14, wherein the UE is further configured to obtain a Physical Random Access Channel (PRACH) resource corresponding to the selected ASC, wherein the PRACH resource comprises a set of available sub-channels and a set of available signatures, and the access time slot and the preamble signature is acquired by the UE by selecting from the set of available sub-channels and the set of available signatures, respectively.

16. The system according to claim 14, wherein the UE is further configured to select, according to the access control information, the access time slot and the preamble signature from a set of all available sub-channels and a set of all available signatures, respectively.

* * * * *